United States Patent Office 3,203,855
Patented Aug. 31, 1965

3,203,855
METHOD FOR COMBATING FUNGI WITH 2 - (2,2,2 - TRICHLORO - 1 - HYDROXYETHYLAMINO)PYRIDINE
Dieter Duerr, Basel, Hans Aebi, Riehen, and Ludwig Ebner, Stein, Switzerland, assignors to Ciba Limited, Basel, Switzerland, a company of Switzerland
No Drawing. Filed July 2, 1963, Ser. No. 292,441
Claims priority, application Switzerland, July 17, 1962, 8,600/62
1 Claim. (Cl. 167—33)

The present invention provides a new composition for the control of harmful micro-organisms, which comprises as active ingredient the compound of the formula

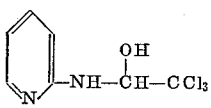

together with one or more of the following additives: Solid vehicles, emulsifiers, dispersing agents, water, wetting agents, organic solvents boiling above 100° C., fertilizers, adhesives and other pesticides.

The present invention is especially concerned with preparations suitable for the systemic control of phytopathogenic microorganisms, containing as active ingredient the compound of the above mentioned formula.

The new preparations are for example, efficient systemic fungicides, especially for the systemic control of genuine mildew on plants.

The effect of the afore-said compound on phytopathogenic bacteria should likewise be mentioned.

The compound of the above formula can be manufactured by known methods, for example in the following manner:

71.5 g. of freshly distilled chloral are added drop by drop to a solution of 45 g. of 2-aminopyridine in 200 ml. of benzene, while cooling with water, and the reaction solution is finally heated for 15 minutes on a water bath. The crystalline substance left on evaporation is recrystallized from benzene with the aid of animal carbon. Yield: 103 g. Melting point: 109–111 C.

Analysis.—$C_7H_7Cl_3N_2O$—Calculated: C, 34.81%; H, 2.92%; N, 11.60%. Found: C, 34.83%; H, 3.19%; N, 11.69%.

A special advantage of the compound of the formula set forth above is that at the concentration needed for its use as an antiparasite agent, it displays no phytotoxic side effects. Furthermore, it is especially advantageous that the active compound does not lose its efficacy towards harmful micro-organisms even in the presence of surface-active substances.

The compound of the above formula may be used either by itself or in conjunction or admixture with other pesticides and/or the further additives listed above.

As an example of the application of the compound of the above formula in plant protection, there may be mentioned the treatment of plant seeds and of completely or only partially developed plants, and also treatment of the soil in which the plants grow to combat harmful microorganisms.

As examples of other pesticides suitable for use in the preparations of the invention, in addition to the compound of the above formula, there may be mentioned: 3:4-dichlorobenzyl alcohol, ammonium compounds for example diisobutyl-phenoxyethoxy-ethyl-dimethyl benzyl ammonium chloride, cetyl pyridinium chloride, cetyl trimethyl ammonium bromide, halogenated dihydroxy-diphenylmethanes, tetramethyl thiuram disulfide, 2:2'-thio-bis-(4:6-dichlorophenol), 2-nitro-2-furfuryl iodide, salicyl anilides, dichlorosalicyl anilides, dibromosalicyl anilides, tribromosalicyl anilide, dichlorocyanuric acid, tetrachlorosalicyl anilides, aliphatic thiuram sulfides and hexachlorophen (=2:2'-dihydroxy-3:5:6-3':5':6'-hexachlorodiphenylmethane).

The preparations of the invention, which contain the active principle of the above formula, may be used in a variety of forms, for example as pastes, powders, emulsions, suspensions, solutions or sprays.

For the manufacture of solutions for direct spraying, there may be used organic solvents boiling above 100° C., for example petroleum fractions of a medium to high boiling range, for example diesel oil or kerosenes, also coal tar oils and oils of vegetable or animal origin, also hydrocarbons for example alkylated naphthalenes, or tetrahydronaphthalene, if desired together with xylene mixtures, cyclohexanols or ketones, furthermore chlorinated hydrocarbons, for example tetrachlorethane, trichlorethylene or trichlorobenzenes or tetrachlorobenzenes.

Aqueous forms of application are particularly suitable for systemic uses. They are prepared from emulsion concentrates, pastes or wettable spray powders, by addition of water.

Suitable emulsifying or dispersing agents are non-ionic products, for example condensation products from aliphatic alcohols, amines or carboxylic acids with a long-chain hydrocarbon radical containing about 10 to 30 carbon atoms with ethylene oxide, for example the condensation product from octadecyl alcohol and 25 to 30 molecular proportions of ethylene oxide, or from commercial oleylamine and 15 molecular proportions of ethylene oxide, or from dodecylmercaptan and 12 molecular proportions of ethylene oxide. As suitable anionic emulsifying agents there may be mentioned: the sodium salt of dodecyl alcohol sulfuric acid ester, the sodium salt of dodecylbenzenesulfonic acid, the potassium or triethanolamine salt of oleic or abietic acid or of mixtures of these two acids, or the sodium salt of a petroleum-sulfonic acid.

Suitable cationic dispersing agents are quaternary ammonium compounds for example cetyl pyridinium bromide or dihydroxy-ethyl benzyl dodecyl ammonium chloride.

When the preparations are used in the form of casting and dusting preparations a solid vehicle is used, for example, talcum, koalin, bentonite, calcium carbonate, calcium phosphate, or carbon, cork meal or wood meal or other materials of vegetable origin. It is also especially advantageous to use the preparations in granulated form. The various forms of application may contain the conventional additives, for example substances capable of improving the distribution, adhesion, stability towards rain or the penetration. As such substances there may be mentioned fatty acids, resins, glue, casein or, for example, alignates.

The following example illustrates the invention. Parts and percentages are by weight.

Example (a) A mixture was prepared in a mixer from 20 g. of the compound of the formula

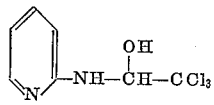

25 g. of finely dispersed $SiO_2$ ("Hy-Sil," trademark), 3.5 g. of a condensation product from 1 mol of dodecylmercaptan with 12 mols of ethylene oxide, 1.5 g. of a condensation product from 1 mol of para-nonylphenol with 9 mols of ethylene oxide, and 50 g. of kaolin (bolus alba), and the mixture was then ground in a rod mill. It formed a fine powder, which could be diluted with water in any desired proportion to form a fine dispersion.

(b) Young seedlings of *Cucumis pepo* were planted in pots. When the seedlings had grown and their cotyledons had fully developed, the pots were treated with 25 ml. of the dispersion described above under (a), which contained 0.1% of the active ingredient described under (a). Two days after this root treatment, the cotyledons of the Cucumis plants treated in this manner were infected with the spores of genuine cucumber mildew (*Erysiphe cichoreacearum*). On evalution, it was found that a systemic fungicide effect towards *Erysiphe cichoreacearum* of 75 to 100%, calculated from the untreated control plants, was achieved.

What is claimed is:

The method for combating phytopathogenic fungi which comprises applying to the area where the said effect is desired a microbiocidally effective amount of the compound of the formula

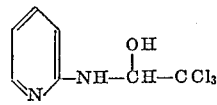

References Cited by the Examiner

UNITED STATES PATENTS

| | | | |
|---|---|---|---|
| 2,786,797 | 3/57 | Lederer | 167—30 |
| 2,913,460 | 11/59 | Brown et al. | 167—33 X |
| 2,975,186 | 3/61 | Bimber | 167—33 |
| 3,041,236 | 6/62 | Stecker | 167—31 |

OTHER REFERENCES

Chemical Abstracts, vol. 42, page 3127i (1948).

Frear: Pesticide Index, College Science Publishers, State College, Pa. (1961), pp. 40, 68, 133, 162–163, 176 and 178.

JULIAN S. LEVITT, *Primary Examiner.*